United States Patent
Zhao et al.

(10) Patent No.: US 12,238,317 B2
(45) Date of Patent: Feb. 25, 2025

(54) BLOCK BASED WEIGHTING FACTOR FOR JOINT MOTION VECTOR DIFFERENCE CODING MODE

(71) Applicant: Tencent America LLC, Palo Alto, CA (US)

(72) Inventors: Liang Zhao, Sunnyvale, CA (US); Xin Zhao, Santa Clara, CA (US); Han Gao, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 56 days.

(21) Appl. No.: 18/215,704

(22) Filed: Jun. 28, 2023

(65) Prior Publication Data

US 2024/0314343 A1 Sep. 19, 2024

Related U.S. Application Data

(60) Provisional application No. 63/451,807, filed on Mar. 13, 2023.

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/137* (2014.11); *H04N 19/176* (2014.11)

(58) Field of Classification Search
CPC ..... H04N 19/44; H04N 19/105; H04N 19/176
See application file for complete search history.

(56) References Cited

U.S. PATENT DOCUMENTS 11,057,640 B2 * 7/2021 Park ...................... H04N 19/56
2017/0347103 A1 * 11/2017 Yu ......................... H04N 19/184
(Continued)

OTHER PUBLICATIONS

B. Bross, J. Chen, S. Liu, and Y.- K. Wang, "Versatile Video Coding Editorial Refinements on Draft 10", Joint Video Experts Team (JVET) of ITU-T SG 16 WP 3 and ISO/IEC JTC 1/SC 29, 20th Meeting, Oct. 7-16, 2020, JVET-T2001, pp. 1-511.
(Continued)

*Primary Examiner* — Zhubing Ren
(74) *Attorney, Agent, or Firm* — ArentFox Schiff LLP

(57) ABSTRACT

Aspects of the disclose provide methods and an apparatus for video and/or image coding. The apparatus includes processing circuitry that receive a bitstream including a frame. Coding information for a block in the frame indicates that the block is coded with a joint motion vector difference (JMVD) coding mode and a compound weighted prediction mode. The coding information includes scaling factor information of the JMVD coding mode. If the scaling factor information indicates that each of scaling factors of components of at least one MVD associated with at least one respective reference frame of the block is a pre-defined scaling factor, a weighting factor of the compound weighted prediction mode is determined based on a list of weighting factors. Otherwise, the weighting factor of the compound weighted prediction mode is determined based on a subset of the list of weighting factors.

20 Claims, 10 Drawing Sheets

(51) Int. Cl.
*H04N 19/137* (2014.01)
*H04N 19/176* (2014.01)

(56) References Cited

U.S. PATENT DOCUMENTS

| | | | | |
|---|---|---|---|---|
| 2019/0246114 | A1* | 8/2019 | Tourapis | H04N 19/513 |
| 2020/0374513 | A1* | 11/2020 | Xiu | H04N 19/176 |
| 2022/0103827 | A1* | 3/2022 | Liu | H04N 19/159 |
| 2023/0156219 | A1 | 5/2023 | Zhao et al. | |

OTHER PUBLICATIONS

Rivaz et al., AV1 Bitstream & Decoding Process Specification The Alliance for Open Media 681, Jan. 8, 2019, pp. 1-681.

Chen et al., An Overview of Core Coding Tools in the AV1 Video Codec, 2018 Picture Coding Symposium (PCS), San Francisco, CA, USA, 2018, pp. 41-45.

Xin Zhao, Shan Liu, Adrian Grange, and Andrey Norkin, "Tool Description for AV1 and libaom," Alliance for Open Media, Codec Working Group, Document: CWG-B078, Oct. 4, 2021, pp. 1-41.

Elliott Karpilovsky, Debargha Mukherjee, "Proposal: New Inter Modes for AV2, " Alliance for Open Media, Codec Working Group, Document: CWG-B018_v1, Feb. 24, 2021, pp. 1-6.

Keng-Shih Lu, Sarah Parker, and Debargha Mukherjee, "Optical Flow Motion Vector Refinement for AV2", Alliance for Open Media, Codec Working Group, Document: CWG-B041_v3, Sep. 20, 2021, pp. 1-11.

Leo Zhao, Xin Zhao, Shan Liu, "Advanced motion vector difference coding", Alliance for Open Media, Codec Working Group, Document: CWG-B092, Nov. 24, 2021, pp. 1-7.

Leo Zhao, Xin Zhao, Shan Liu, "Improved adaptive MVD resolution", Alliance for Open Media, Codec Working Group, Document: CWG-C011-v3, Feb. 9, 2022, pp. 1-7.

International Search Report with Written Opinion issued in Application No. PCT/US2023/069347, mailed Oct. 10, 2023, 22 pages.

* cited by examiner

Magnitude class for motion vector difference

| MV class | Magnitude of MVD |
|---|---|
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

FIG. 4

Adaptive motion vector difference in each motion vector magnitude class

| MV class | Magnitude of MVD |
|---|---|
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

FIG. 5

Supported motion vector precisions in two sets

| Frame level maximum precision | Supported MV precisions |
|---|---|
| 1/8 | 1/8, 1/2, 1, 4 |
| 1/4 | 1/4, 1, 4, 8 |

FIG. 6

Scaling factors for JOINT_AMVDNEWMV

| Index | Scaling factors for a first component and a second component |
|---|---|
| 0 | 1 |
| 1 | 2 |
| 2 | 1/2 |

FIG. 7

Scaling factors for JOINT_NEWMV

| Index | Scaling factor for a first component | Scaling factor for a second component |
|---|---|---|
| 0 | 1 | 1 |
| 1 | 1 | 2 |
| 2 | 2 | 1 |
| 3 | 1 | 1/2 |
| 4 | 1/2 | 1 |

FIG. 8

Look-up table for each scaling factor pair

| Scaling factor pair | A weighting factor for blending prediction samples |
|---|---|
| (1/2, 1/2) | 3 (or 6) |
| (2, 2) | 5 (or 10) |
| (1/2, 1) | 3 (or 6) |
| (1, 1/2) | 3 (or 6) |
| (2, 1) | 5 (or 10) |
| (1, 2) | 5 (or 10) |

FIG. 9

BLOCK BASED WEIGHTING FACTOR FOR JOINT MOTION VECTOR DIFFERENCE CODING MODE

INCORPORATION BY REFERENCE

The present application claims the benefit of priority to U.S. Provisional Application No. 63/451,807, "Block Based Weighting Factor for Joint Motion Vector Difference Coding Mode" filed on Mar. 13, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and an apparatus for video and/or picture encoding/decoding. The apparatus includes processing circuitry configured to receive a bitstream including a frame. Coding information for a block in the frame indicates that the block is coded with a joint motion vector difference (JMVD) coding mode and a compound weighted prediction mode. The coding information further includes scaling factor information of the JMVD coding mode. In response to the scaling factor information indicating that each of scaling factors of components of at least one MVD associated with at least one respective reference frame of the block is a pre-defined scaling factor, the processing circuitry determines a weighting factor of the compound weighted prediction mode based on a list of weighting factors. In response to the scaling factor information indicating that at least one of the scaling factors is different from the pre-defined scaling factor, the processing circuitry determines the weighting factor of the compound weighted prediction mode based on a subset of the list of weighting factors. The processing circuitry can further determine, using the JMVD coding mode, motion information associated with respective reference frames of the block based on the scaling factors of the components of the at least one MVD associated with the at least one respective reference frame of the block. The reference frames of the block include the at least one respective reference frame. The processing circuitry reconstruct, using the compound weighted prediction mode, the block based on the motion information associated with the respective reference frames of the block and the determined weighting factor. In an example, the list is signaled in the bitstream. In an example, only the subset of the list is signaled in the bitstream.

In an embodiment, the processing circuitry is configured to receive a bitstream including a frame. The coding information for a block in the frame indicates that the block is coded with a joint MVD coding mode and a compound weighted prediction mode. The coding information further indicates weighting factor information of the compound weighted prediction mode. In response to the weighting factor information indicating that an equal weighting factor is applied to each of reference frames of the block, the processing circuitry determines scaling factors of components of at least one MVD associated with at least one respective reference frame in the reference frames based on a list of scaling factors. In response to the weighting factor information indicating that unequal weighting factors are applied to the reference frames of the block, the processing circuitry determines the scaling factors of the components of the at least one MVD based on a subset of the list of scaling factors. The processing circuitry further determines, using the joint MVD coding mode, motion information associated with the respective reference frames of the block based on the determined scaling factors and reconstructs, using the compound weighted prediction mode, the block based on the motion information associated with the respective reference frames of the block and the weighting factor information.

Aspects of the disclosure also provide a non-transitory computer-readable medium storing instructions which when executed by a computer for video encoding/decoding cause the computer to perform the methods for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 4 shows a relationship between a class for a non-zero component of a motion vector difference (MVD) and a magnitude range of the non-zero component of the MVD according to an embodiment of the disclosure.

FIG. 5 shows a relationship between a class for a non-zero component of an MVD and a magnitude of the non-zero component of the MVD according to an embodiment of the disclosure.

FIG. 6 shows supported motion vector (MV) precisions in two precision sets according to an embodiment of the disclosure.

FIG. 7 shows exemplary scaling factors for a JOINT_AMVDNEWMV mode according to an embodiment of the disclosure.

FIG. 8 shows exemplary scaling factors for a JOINT_NEWMV mode according to an embodiment of the disclosure.

FIG. 9 shows an exemplary look-up table indicating a relationship between a scaling factor pair and a corresponding weighting factor according to an embodiment of the disclosure.

DETAILED DESCRIPTION OF EMBODIMENTS

Figure 1:
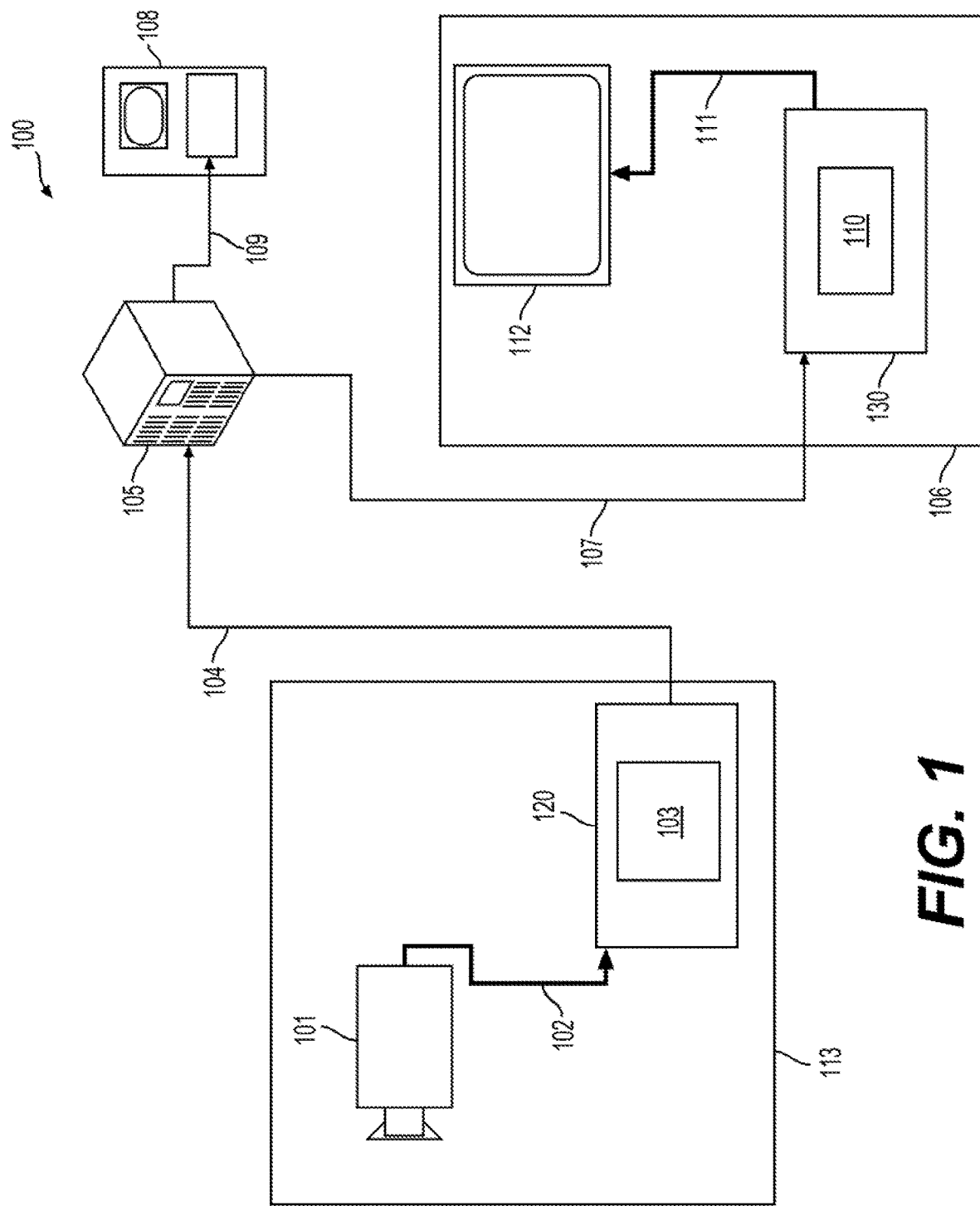
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVCq). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
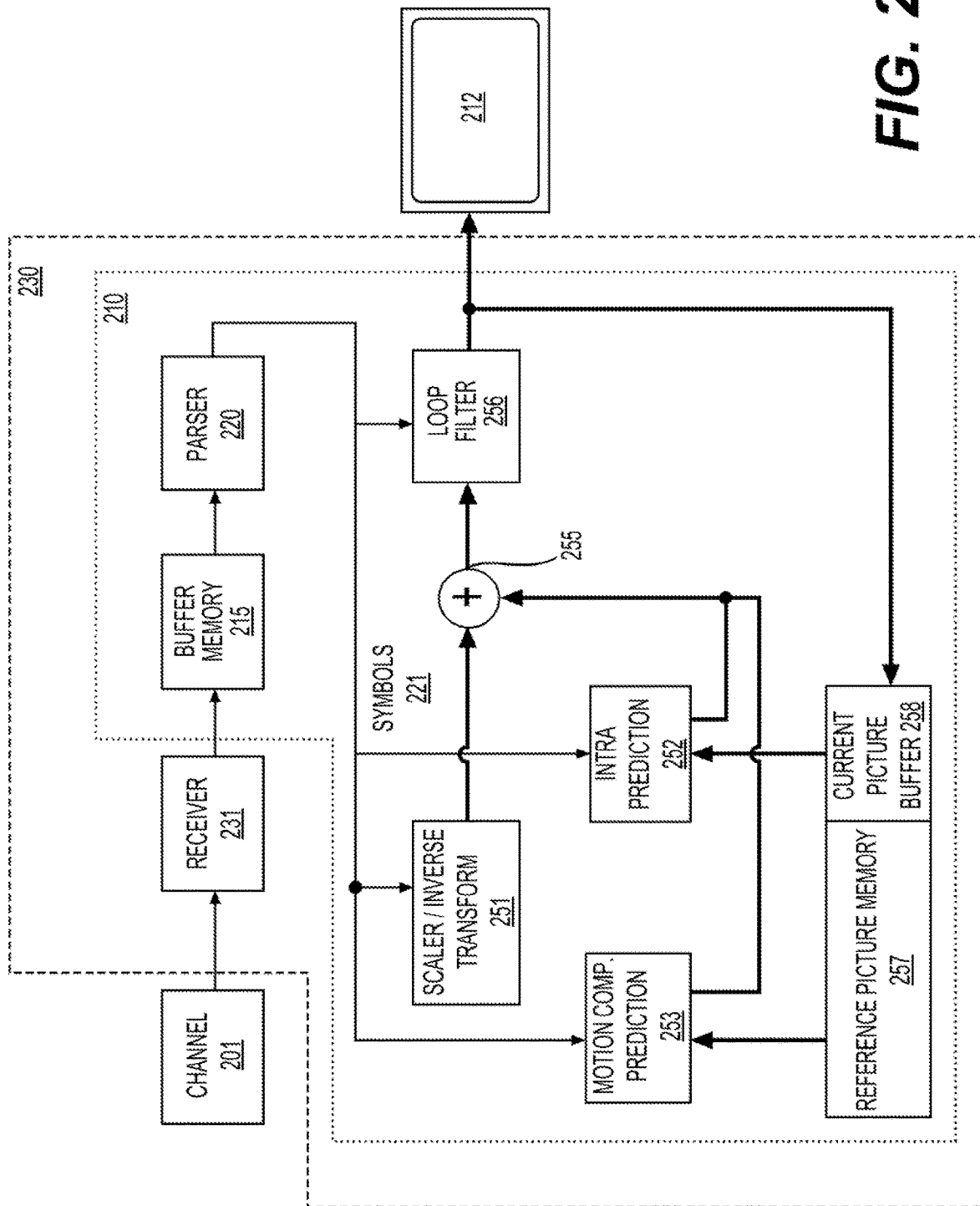
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
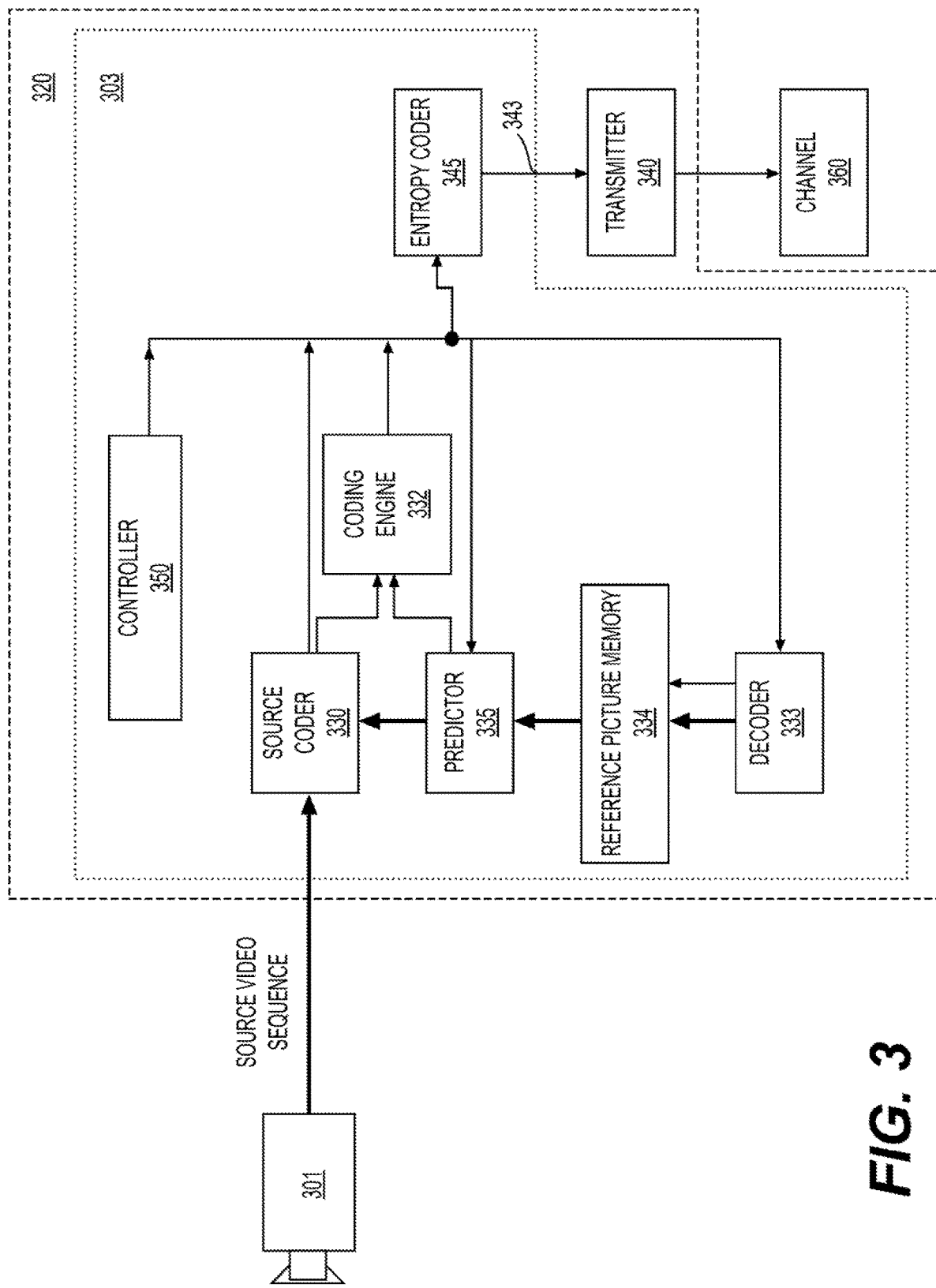
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

In an embodiment, inter mode coding, such as used in codec working group (CWG)-B018, is described below. In an example, such as in AOMedia Video 1 (AV1), for each coded block in an inter frame (or an inter picture), if a mode of a current block is not a skip mode and is an inter-coded mode, then a flag is signaled to indicate whether a single reference mode or a compound reference mode is used to code the current block. A prediction block can be generated by a motion vector (MV) of a block (e.g., the current block) in the single reference mode. A prediction block can be generated by averaging (e.g., weighted averaging) of multiple prediction blocks (or multiple reference blocks), such as two prediction blocks derived from two MVs in the compound reference mode.

For the single reference case using the single reference mode, the following modes including but not limited to a NEARMV mode, a NEWMV mode, a GLOBALMV mode, and/or the like can be signaled.

In the NEARMV mode, a motion vector predictor (MVP) of MVPs in a list can be used. The MVP can be indicated by an index, such as a Dynamic Reference List (DRL) index. In an example, the MVP is used as an MV of block.

In the NEWMV mode, an MVP of MVPs in a list can be used as a reference. The MVP can be signaled by an index, such as a DRL index. A delta (e.g., a delta MV) can be applied to the reference (e.g., the MVP indicated by the DRL index). In an example, an MV of the block is determined based on the delta and the MVP. For example, the delta can indicate an MV difference (MVD) between the MVP and the MV of the block.

In the GLOBALMV mode, an MV based on frame-level global motion parameters can be used, for example, to predict the block.

For the compound reference modes, the following modes including but not limited to a NEAR_NEARMV mode, a NEAR_NEWMV mode, a NEW_NEARMV mode, a NEW_NEWMV mode, a GLOBAL_GLOBALMV mode, and/or the like can be signaled.

In the NEAR_NEARMV mode, an MVP of MVPs in a list can be used. The MVP can be signaled by an index, such as a DRL index. In an example, the MVP of the MVPs in the list can be used to predict the block. For example, the MVP can indicate a first MV and a second MV of the block, and the first MV and the second MV of the block can be used to generate a first reference block and a second reference block, respectively, to predict the block.

In the NEAR_NEWMV mode, an MVP of MVPs in a list can be used as a reference. The MVP can be signaled by an index, such as a DRL index. A delta (e.g., a delta MV) can be applied to the reference (e.g., the MVP indicated by the DRL index) to determine a second MV of the block. In an example, the reference is used, for example, directly as a first MV of the block.

In the NEW_NEARMV mode, an MVP of MVPs in a list can be used as a reference. The MVP can be signaled by an index, such as a DRL index. A delta (e.g., a delta MV) can be applied to the reference (e.g., the MVP indicated by the DRL index) to determine a first MV of the block. In an example, the reference is used, for example, directly as a second MV of the block.

In the NEW_NEWMV mode, an MVP of MVPs in a list can be used as a reference. The MVP can be signaled by an index, such as a DRL index. Two deltas (e.g., two delta MVs) can be applied to the reference (e.g., the MVP indicated by the DRL index) to determine a first MV of the block and a second MV of the block. In an example, the two deltas are signaled.

In the GLOBAL_GLOBALMV mode, MVs from each reference based on respective frame-level global motion parameters can be used, for example, to predict the block.

In the disclosure, the terms a first component and a second component of a 2D vector (e.g., an MV, an MVD, a delta MV, or the like) can refer to values of the 2D vector along a first axis and a second axis, respectively. The first axis and the second axis can be two pre-defined directions that are perpendicular to each other. In an example, the first axis and the second axis are the x-axis and the y-axis, and the first component and the second component are the horizontal component and the vertical component of the 2D vector. In an example, the first axis and the second axis are a 45-degree axis and a 135-degree axis, and the first component and the second component are the components of the 2D vector along 45-degree axis and the 135-degree axis, respectively.

Embodiments in the disclosure can be applied to the first component and the second component of the 2D vector (e.g., an MV, an MVD, a delta MV, or the like). In an example, the x-axis and the y-axis can be replaced by two other axes along two pre-defined directions that are perpendicular to each other, and the embodiments in the disclosure for the horizontal component and the vertical component of the 2D parameter can also apply to the two other axes. For example, the x-axis and the y-axis can be replaced by the 45-degree axis and the 135-degree axis.

Various methods can be used to code an MVD. An exemplary method, such as used in AV1 is described below. In an embodiment, such as in AV1, a ⅛ pixel motion vector precision (or accuracy) can be used, and the following syntaxes (e.g., including but not limited to one or more of mv_joint, mv_sign, mv_class, mv_bit, mv_fr, mv_hp, and/or the like) can be used to signal or indicate an MVD in a reference frame list 0 or a reference frame list 1.

The syntax mv_joint can specify which components (e.g., a first component and a second component) of the MVD are non-zero. For example, the syntax mv_joint being a first value (e.g., 0) indicates there is no non-zero MVD along either the first axis (e.g., a horizontal direction) or the second axis (e.g., a vertical direction); the syntax mv_joint being a second value (e.g., 1) indicates there is a non-zero MVD only along the first axis (e.g., the horizontal direction); the syntax mv_joint being a third value (e.g., 2) indicates there is a non-zero MVD only along the second axis (e.g., the vertical direction); and the syntax mv_joint being a fourth value (e.g., 3) indicates there is non-zero MVDs along both the first axis and the second axis (e.g., the horizontal direction and the vertical direction).

The syntax mv_sign can specify whether the MVD is positive or negative. For example, a syntax mv_sign can be associated with each non-zero component of the MVD, and can indicate a sign of the respective non-zero component of the MVD.

In an embodiment, the syntaxes mv_class, mv_bit, mv_fr, and mv_hp are used to indicate a magnitude of a non-zero component of the MVD. An integer part of the magnitude of the non-zero component of the MVD can be indicated by the syntaxes mv_class and mv_bit. A fractional part of the magnitude of the non-zero component of the MVD can be indicated by the syntaxes mv_fr and mv_hp.

The syntax mv_class (an MV class) can specify a class (e.g., a magnitude class) of the MVD. For example, a syntax mv_class can be associated with each non-zero component of the MVD, and can indicate a class of the respective non-zero component of the MVD, such as shown in FIG. 4.

FIG. 4 shows a relationship between a class (or an MV class) for a non-zero component of the MVD and a magnitude range of the non-zero component of the MVD. In an embodiment, a higher class indicates that the MVD (e.g., the non-zero component of the MVD) has a larger magnitude. The first column in FIG. 4 shows various MV classes, such as from an MV class 0 (MV_CLASS_0) to an MV class 10 (MV_CLASS_10). The MV class 10 is higher than the MV classes 0-9. The second column in FIG. 4 shows corresponding magnitude ranges indicated by (m1, m2]. The value m1 is referred to as a starting magnitude of the MV class that corresponds to the magnitude range (m1, m2]. In the example shown in FIG. 4, the starting magnitudes of the MV classes (e.g., the MV class 0 (MV_CLASS_0) to the MV class 10 (MV_CLASS_10)) are 0, 2, 4, 8, 16, 32, 64, 128, 256, 512, and 1024, respectively. For the magnitude range (m1, m2], a magnitude of a non-zero component of the MVD is larger than m1 and is less than or equal to m2. For example, the MV_CLASS_0 corresponds to a magnitude range (0, 2] (e.g., m1=0, m2=2) that is larger than 0 and is less than or equal to 2. The value m1 (e.g., 0) is the starting magnitude of the MV_CLASS_0. If a syntax mv_class of a non-zero component of the MVD is MV_CLASS_0, a magnitude of the non-zero component of the MVD is larger than 0 and is less than or equal to 2.

The syntax mv_bit can specify an integer part of an offset between the MVD and a starting magnitude of each MV class. For example, the syntax mv_bit can be associated with each non-zero component of the MVD, and can indicate an integer part of a difference (or an offset) between the respective non-zero component of the MVD and a starting magnitude of the corresponding MV class. For example, a non-zero component of the MVD has an MV class of MV_CLASS_10, the syntax mv_bit associated with the non-zero component of the MVD indicates an integer part of a difference between the non-zero component of the MVD and 1024.

The syntax mv_fr can specify first two fractional bits of the MVD. For example, a syntax mv_fr can be associated with each non-zero component of the MVD, and can indicate first two fractional bits of the respective non-zero component of the MVD.

The syntax mv_hp can specify a third fractional bit of the MVD. For example, a syntax mv_hp can be associated with each non-zero component of the MVD, and can indicate a third fractional bit of the respective non-zero component of the MVD.

An adaptive MVD resolution (AMVD) can be used, such as in CWG-B092. In an embodiment, for certain inter prediction modes, such as the NEW_NEARMV mode and the NEAR_NEWMV mode, a precision of an MVD can depend on an associated class (e.g., an MV class) and/or a magnitude of MVD. For example, a precision of a non-zero component of the MVD can depend on an associated class (e.g., an MV class) and/or a magnitude of the non-zero component of the MVD. In an example, a fractional MVD is allowed only if an MVD magnitude is equal to or less than one-pixel. For example, a fractional part of the non-zero component of the MVD is allowed only if the magnitude of the non-zero component of the MVD is equal to or less than one-pixel.

In an example of the AMVD, only one MVD value is allowed when a value of the associated MV class is equal to or greater than MV_CLASS_1. The MVD value in each MV class can be derived as 4, 8, 16, 32, or 64 for an MV class 1 (MV_CLASS_1), an MV class 2 (MV_CLASS_2), an MV class 3 (MV_CLASS_3), an MV class 4 (MV_CLASS_4), or an MV class 5 (MV_CLASS_5). For example, the non-zero component of the MVD in each MV class can be derived as 4, 8, 16, 32, or 64 for an MV class 1 (MV_CLASS_1), an MV class 2 (MV_CLASS_2), an MV class 3 (MV_CLASS_3), an MV class 4 (MV_CLASS_4), or an MV class 5 (MV_CLASS_5).

FIG. 5 shows the adaptive MVD in each MV magnitude class according to an embodiment of the disclosure. For example, FIG. 5 shows exemplary allowed MVD values in each MV class. For example, if the MV class is MV_CLASS_0, then the magnitude of the non-zero component of the MVD can be between 0 and 1 (not including 0), 1, or 2. If the MV class is one of MV classes including MV_CLASS_1 to MV_CLASS_10, the magnitude of the non-zero component of the MVD can be a single value, such as 4, 8, 16, 32, 64, 128, 256, 512, 1024, or 2048.

In an example, if a current block is coded with the NEW_NEARMV mode or the NEAR_NEWMV mode, one context (e.g., for context-adaptive binary arithmetic coding (CABAC)) is used to signal syntaxes such as the syntax mv_joint or the syntax mv_class. Otherwise, another context (e.g., for CABAC) can be used to signal the syntaxes such as the syntax mv_joint or the syntax mv_class.

A joint MVD coding (JMVD) mode can be applied in some embodiments, such as in CWG-B092.

A new inter coded mode, referred to as a JOINT_NEWMV mode, can be applied to indicate whether MVDs for multiple reference lists (e.g., two reference lists) are jointly signaled. If the inter prediction mode is equal to the JOINT_NEWMV mode, MVDs for multiple reference lists (e.g., a reference list 0 and a reference list 1) can be jointly signaled. Thus, in an example of the JOINT_NEWMV mode, only one MVD (also referred to as a joint MVD or joint_mvd) is signaled and transmitted to a decoder, and delta MVs (e.g., MVDs) for the respective multiple reference lists (e.g., the reference list 0 and the reference list 1) are derived from the one MVD (e.g., the joint_mvd). In an example, joint MVD information indicating the joint MVD (e.g., the joint_mvd) is signaled, and the delta MVs for the multiple reference lists are derived from the joint MVD information.

In an embodiment, the JOINT_NEWMV mode is one of the compound reference modes. For example, the JOINT_NEWMV mode is signaled together with other compound reference modes, such as the NEAR_NEARMV mode, the NEAR_NEWMV mode, the NEW_NEARMV mode, the NEW_NEWMV mode, the GLOBAL_GLOBALMV mode, and/or the like. In an embodiment, no additional contexts are added. In an example, the JOINT_NEWMV mode is signaled as one of the compound reference modes.

When the JOINT_NEWMV mode is signaled and picture order count (POC) distances between the multiple reference frames (e.g., two reference frames) and a current frame are different, an MVD can be scaled for the reference frame list 0 or the reference frame list 1 based on the POC distances. In an embodiment, the POC distance between a first reference frame in the reference frame list 0 and the current frame is represented by a parameter td0 and the POC distance between a second reference frame in the reference frame list 1 and the current frame is represented by a parameter td1. If td0 is equal to or larger than td1, the joint_mvd can be used directly for the first reference frame in the reference list 0 as a first MVD (represented by MVP0). A second MVD (e.g., represented by MVP1 or derived_mvd1) for the second reference frame in the reference frame list 1 can be derived from the joint_mvd, for example, based on Eq. (1).

$$\text{derived\_mvd1} = \frac{td1}{td0} * \text{joint\_mvd} \qquad (1)$$

Otherwise, if td1 is equal to or larger than td0, the joint_mvd can be used directly for the second reference frame in the reference list 1 as the second MVD (e.g., MVP1). The first MVD (e.g., represented by MVP0 or derived_mvd0) for the first reference frame in the reference frame list 0 can be derived from the joint_mvd based on Eq. (2).

$$derived\_mvd0 = \frac{td0}{td1} * joint\_mvd \qquad (2)$$

In an embodiment, such as in CWG-C011, the adaptive MVD resolution (AMVD) can be modified or improved.

A new inter coded mode, referred to as an AMVDMV mode, can be added to the single reference modes. When the AMVDMV mode is selected, that the AMVD is applied to signal an MVD is indicated.

In an embodiment, a flag, referred to as an amvd_flag, can be added to the JOINT_NEWMV mode to indicate whether the AMVD is applied to the joint MVD coding mode. When the adaptive MVD resolution (the AMVD) is applied to the joint MVD coding mode, the joint MVD coding mode can be referred to as a joint AMVD coding mode. In the joint AMVD coding mode, the joint MVD for the multiple reference frames (e.g., two reference frames) can be jointly signaled and a precision of the joint MVD can be implicitly determined by MVD magnitude(s). Otherwise, for example, when the AMVD is not applied to the joint MVD coding mode, the joint MVD for the multiple reference frames (e.g., the two reference frames) can be jointly signaled, and an MVD coding (e.g., described with reference to FIG. 4) different from the AMVD is applied.

Alternatively, a new inter prediction mode in the compound reference modes, referred to as a JOINT_AMVD-NEWMV mode is added to indicate that the AMVD is applied to the joint MVD coding mode. In an embodiment, in the JOINT_AMVDNEWMV mode, the joint MVD for the multiple reference frames (e.g., the two reference frames) can be jointly signaled and a precision of the joint MVD can be implicitly determined by MVD magnitude(s).

In an embodiment, such as in CWG-C012 and CWG-C020, an adaptive motion vector resolution (AMVR) can be applied.

In an example, such as in CWG-C012, the AMVR is used where a total of 7 MV precisions (e.g., 8 pixel or 8-pel, 4-pel, 2-pel, 1-pel, ½-pel, ¼-pel, and ⅛-pel) are supported. For each prediction block, an encoder (e.g., an AOM Video Model (AVM) encoder) can search the supported MV precisions, such as all the supported precision values, and can signal the selected precision (e.g., the best precision) to a decoder.

To reduce an encoder run-time, two precision sets, such as shown in FIG. 6, can be supported. FIG. 6 shows supported MV precisions in the two precision sets. A number (e.g., 4) of MV precisions in each of the two precision sets is smaller than a number (e.g., 7) of MV precisions in the supported precision values. In an example, each precision set includes 4 predefined precisions. The precision set can be adaptively selected at a frame level based on a value of the maximum precision of a frame. In an example, such as used in AV1, the maximum precision can be signaled in a frame header. FIG. 6 shows the supported precision values based on the frame level maximum precision according to an embodiment of the disclosure. If the frame level maximum precision is ⅛-pel, the precision set includes ⅛-pel, ½-pel, 1-pel, and 4-pel. If the frame level maximum precision is ¼-pel, the precision set includes ¼-pel, 1-pel, 4-pel, and 8-pel.

In an example, such as in the current AVM software which is similar to AV1, a flag, such as a frame level flag (e.g., a cur_frame_force_integer_mv flag) is used to indicate if MV(s) of a frame can include sub-pel precision(s), such as ½-pel, ¼-pel, and ⅛-pel. In an example, the AMVR is enabled only if a value of the frame level flag (e.g., the cur_frame_force_integer_mv flag) is 0. In an example, in the AMVR, if the precision of the block is lower than the maximum precision, a motion model and interpolation filter(s) are not signaled. If the precision of the block is lower than the maximum precision, the motion mode can be inferred as a translation motion and the interpolation filter can be inferred as a REGULAR interpolation filter. Similarly, in an example, if the precision of the block is either 4-pel or 8-pel, the inter-intra mode is not signaled and can be inferred to be 0.

In an embodiment, such as in CWG-C053, the joint MVD coding mode can be modified or improved. The joint MVD coding mode can refer to the JOINT_NEWMV mode or the JOINT_AMVDNEWMV mode.

If a block is coded with the joint MVD coding mode, such as the JOINT_NEWMV mode or the JOINT_AMVD-NEWMV mode, a syntax (e.g., a scaling factor index), such as mvd_scaling_factor_idx, can be signaled into a bitstream to explicitly indicate, for example, a scaling factor (e.g., represented by jmvd_scale) between MVDs associated with the reference frame 0 and the reference frame 1.

As shown in FIGS. 7-8, two look-up tables (e.g., two pre-defined look-up tables) can be used to store supported or allowed scaling factors for the JOINT_AMVDNEWMV mode and the JOINT_NEWMV mode, respectively. An associated entry index for the selected scaling factor(s) in the respective look-up table (e.g., the look-up table in FIG. 7 or in FIG. 8) can be signaled in the bitstream.

FIG. 7 shows exemplary scaling factors for the JOINT_AMVDNEWMV mode. For the JOINT_AMVD-NEWMV mode, a same scaling factor can be applied to the first component and the second component (e.g., the vertical component and the horizontal component) of the MVD(s) for the reference frame list 0 and/or the reference frame list 1.

FIG. 8 shows exemplary scaling factors for the JOINT_NEWMV mode. For the JOINT_NEWMV mode, a scaling factor for one component (e.g., the vertical component or the horizontal component) of an MVD can be restricted to be a first value (e.g., 1), and a scaling factor for another component of the MVD can be another value (e.g., 2, ½, or the like) that is different from the first value (e.g., 1).

The MVD for the reference frame list 0 or the reference frame list 1 can be calculated based on Eqs. (3)-(4), respectively.

$$mvd\_ref0 = joint\_mvd \qquad (3)$$

$$mvd\_ref1 = joint\_mvd * \frac{td1}{td0} * jmvd\_scale \qquad (4)$$

In an example, in the JOINT_AMVDNEWMV mode, the scaling factor (e.g., jmvd_scale) is the same for the first component and the second component (e.g., the vertical component and the horizontal component) of the MVD (e.g., mvd_ref1), and Eqs. (3)-(4) can be applied to the MVD or each component of the MVD. For example, a first MVD (e.g., MVD0) for the reference frame list 0 is indicated by mvd_ref0 and is obtained directly from joint_mvd (e.g., that is being signaled) and a second MVD for the reference frame list 1 is indicated by mvd_ref1 and is obtained by modifying the joint_mvd with a ratio of td1/td0 such as described in Eq.

(1) and the scaling factor (e.g., jmvd_scale). Eqs. (3)-(4) can be modified to determine the first MVD based on the scaling factor and a ratio of td0/td1 such as described in Eq. (2) and to determine the second MVD directly from joint_mvd.

In an example, in the JOINT_NEWMV mode, the scaling factors (e.g., jmvd_scale) for the first component and the second component (e.g., the vertical component and the horizontal component) of the MVD are different. Eqs. (3)-(4) can be applied to each component of the MVD (e.g., MVD0 or MVD1).

In an embodiment, a bi-prediction with CU-level weight (BCW) mode (also referred to as a compound weighted prediction) can be applied to a block. In an example, such as in HEVC, a bi-prediction signal is generated by averaging two prediction signals obtained from two different reference pictures and/or using two different MVs. In an example, such as in VVC, the bi-prediction mode can be extended beyond simple averaging to allow weighted averaging of two prediction signals, such as shown in Eq. (5).

$$P_{bi-pred} = ((8-w) \times P_0 + w \times P_1 + 4) \gg 3 \quad (5)$$

In an example, the bi-prediction signal $P_{bi-pred}$ is a bi-prediction sample, and the two prediction signals $P_0$ and $P_1$ are two prediction samples.

Referring to Eq. (5), the bi-prediction signal $P_{bi-pred}$ can be a weighted average of the two prediction signals $P_0$ and $P_1$ with weights (8-w) and w, respectively. In an example, a sum of the weights (8-w) and w is a constant (e.g., 8).

In an embodiment, a list of weighting factors (e.g., including five weights) are allowed in the weighted averaging bi-prediction or in the BCW mode. In an example, the list of weighting factors includes the five weights-2, 3, 4, 5, and 10, e.g., w∈{-2, 3, 4, 5, 10}. When w is equal to 4, an equal weighting factor (e.g., 4) can be used to in the weighted average of two prediction samples. For example, the weight factors for the two prediction signals $P_0$ and $P_1$ are equal (e.g., being 4), and Eq. (5) becomes $P_{bi-pred}$=(4× $P_0$+4× $P_1$+4)>>3.

For each bi-predicted CU, the weight w can be determined in one of two ways: 1) for a non-merge CU, a weight index can be signalled after the MVD; 2) for a merge CU, the weight index can be inferred from neighbouring blocks based on a merge candidate index.

In an example, the BCW mode is only applied to CUs with 256 or more luma samples (e.g., a CU width×a CU height≥256). In an example, for low-delay pictures, the list of weighting factors (e.g., including all 5 weights) are used. For non-low-delay pictures, a subset of the list of weighting factors are used. In an example, the subset of the list of weighting factors includes only 3 weights (e.g., w∈{3, 4, 5}) in the list of weighting factors. In an example, the low-delay pictures can refer to pictures where a coding order of the pictures is identical to a display order of the pictures, for example, the pictures are coded sequentially.

Eq. (5) can be adapted, for example, such that the bi-prediction signal $P_{bi-pred}$ can be a weighted average of the two prediction signals $P_0$ and $P_1$ with weights (16-w) and w, respectively, such as shown in Eq. (6). In an example, a sum of the weights (16-w) and w is a constant (e.g., 16).

$$P_{bi-pred} = ((16-w) \times P_0 + w \times P_1 + 8) \gg 4 \quad (6)$$

In an embodiment, for the joint MVD coding mode (JMVD), a scaling factor (e.g., jmvd_scale) between MVDs associated with the reference frame list 0 and the reference frame list 1 is used, such as described above in FIGS. 7-8 and Eq. (4). In an example, when applying the BCW mode and the JMVD mode to a block, such as applying the BCW mode to the JMVD mode, 5 weighting factors such as w∈{-2, 3, 4, 5, 10} are used for each supported scaling factor, and thus a large number of bits are to be signaled and a signaling cost is relatively high.

The disclosure describes a set of advanced image and video coding technologies including embodiments related to block-based weighting factor(s) for the joint MVD coding mode.

In the disclosure, a direction of a reference frame can be determined based on whether the reference frame is prior to a current frame in a display order or after the current frame in the display order.

In the disclosure, the JMVD mode may refer to the JMVD with a regular full MV resolution (e.g., a highest resolution such as ¼-pel or ⅛-pel), or the JMVD with the AMVR.

In some embodiments, when the joint MVD coding mode is applied to code a block in a frame (or a current frame), scaling factor(s) used in the joint MVD coding mode can be determined based on a list of scaling factors L0s that are allowed or supported. When the BCM mode is applied to code the block, a weighting factor used in the BCM mode can be determined based on a list of weighting factors $L0_w$ that are allowed or supported. According to embodiments of the disclosure, when both the joint MVD coding mode and the BCM mode are applied to code the block, the scaling factor(s) used in the joint MVD coding mode can be determined based on a subset of the list of scaling factors L0s and/or the weighting factor used in the BCM mode can be determined based on a subset of the list of weighting factors $L0_w$, for example, to reduce a signaling cost and improve coding efficiency.

According to an embodiment of the disclosure, when the joint MVD coding mode is selected to code the block in the frame and scaling factors of components (e.g., a first component and a second component) of at least one MVD (e.g., mvd_ref1 in Eq. (4)) associated with at least one reference frame (e.g., the first reference frame) of the block is a given value (also referred to as a pre-defined scaling factor) (e.g., 1), the list of weighting factors $L0_w$ can be supported to perform a weighted average of prediction samples from reference frame(s) (e.g., multiple reference frames) of the block. The reference frame(s) (e.g., the multiple reference frames) of the block can include the at least one reference frame of the block. Otherwise, when other scaling factor(s) are selected for the joint MVD coding mode, a subset of the list of weighting factors $L0_w$ can be allowed. In an example, weighting factor information (e.g., a weight factor index) can be signaled to indicate which weighting factor(s) in (i) the subset of the list of weighting factors $L0_w$ or (ii) the list of weighting factors $L0_w$ can be selected to perform the weighted average of the prediction samples. The weighted average of the prediction samples can be performed by the BCW mode, such as described in Eq. (5) or Eq. (6). The list of weighting factors $L0_w$ can be pre-defined. The subset of the list of weighting factors $L0_w$ can be pre-defined.

In an embodiment, the block in the frame is coded with the joint MVD coding mode and the BCW mode. The joint MVD coding mode can refer to the JOINT_NEWMV mode (e.g., with or without the AMVR) or the JOINT_AMVD-NEWMV mode (e.g., with or without the AMVR). In an example, the reference frame(s) include a first reference frame from the reference frame list 0 and a second reference frame from the reference frame list 1, and MVDs of the block include a first MVD (e.g., MVD0 or mvd_ref0) associated with the first reference frame and a second MVD (e.g., MVD1 or mvd_ref1) associated with the second reference frame.

In an example, the joint MVD coding mode is the JOINT_AMVDNEWMV mode, and Eqs. (3)-(4) are used to determine the first MVD (e.g., mvd_ref0) and the second MVD (e.g., mvd_ref1), respectively. The at least one respective reference frame can refer to the second reference frame, and the at least one MVD can refer to the second MVD. Referring to FIG. 7, the scaling factors of the first component and the second component of the second MVD can be identical, such as 1, 2, or ½. In an example, the pre-defined scaling factor is 1. If the scaling factors of the components of the second MVD are equal to the pre-defined scaling factor 1 (corresponding to an index 0 in FIG. 7), a weighting factor of the BCW mode can be determined based on the list of weighting factors $L0_w$. Otherwise, the weighting factor of the BCW mode can be determined based on the subset of the list of weighting factors $L0_w$. In an example, $L0_w$ includes 5 weights such as −2, 3, 4, 5, and 10.

In an example, the joint MVD coding mode is the JOINT_NEWMV mode, and Eqs. (3)-(4) are used to determine the first MVD (e.g., mvd_ref0) and the second MVD (e.g., mvd_ref1), respectively. For example, the first MVD (e.g., mvd_ref0) is determined directly from joint_mvd, and each component of the second MVD (e.g., mvd_ref1) is determined using Eq. (4) with the respective scaling factor (e.g., jmvd_scale). In an example, the pre-defined scaling factor is 1, and the scaling factors for the first component and the second component (e.g., the horizontal component and the vertical component) are 1 and 2 (e.g., an index of 1 in FIG. 8), and thus the scaling factors of the components of the second MVD include a scaling factor (e.g., 2 of the vertical component) that is different from the pre-defined scaling factor (e.g., 1), a weighting factor of the BCW mode can be determined based on the subset of the list of weighting factors $L0_w$. If the scaling factors for the first component and the second component (e.g., the vertical component and the horizontal component) are equal to 1 (corresponding to an index 0 in FIG. 8), then the weighting factor of the BCW mode can be determined based on the list of weighting factors $L0_w$.

Motion information associated with the respective reference frame(s) of the block can be determined using the joint MVD coding mode based on the scaling factors of the components of the at least one MVD associated with the at least one respective reference frame of the block. For example, the motion information includes a first MV associated with the first reference frame and a second MV associated with the second reference frame. The first MV can be determined based on the first MVD (e.g., using Eq. (3)) and a first MVP, and the second MV can be determined based on the second MVD (e.g., using Eq. (4)) and a second MVP. The first MVP and the second MVP can be determined based on an index (e.g., a DRL index) and a list of MVPs. In an example, an entry in the list of MVPs indicates the first MVP and the second MVP.

The block can be reconstructed using the BCW mode based on the motion information associated with the respective reference frames of the block and the determined weighting factor w. For example, a first reference block (or a first prediction block) (e.g., including sample values indicated by $P_0$) is determined based on the first MV, and a second reference block (or a second prediction block) (e.g., including sample values indicated by $P_1$) is determined based on the second MV. The bi-prediction block (e.g., sample values indicated $P_{bi-pred}$) can be determined by the BCW mode (e.g., using Eq. (5) or (6)).

In an embodiment, when a scaling factor for either the first component or the second component of one of the at least one MVD associated with the at least one reference frame of the block is not equal to the given value (e.g., 1) for the joint MVD coding mode, only one weighting factor is allowed in the BCW mode. The one weighting factor can be pre-defined. In an example, no signaling of the one weighting factor is needed. If the given value is 1, only one weighting factor is allowed if the index is 1 or 2 in FIG. 7 (e.g., the JOINT_AMVDNEWMV mode), and only one weighting factor is allowed if the index is 1, 2, 3, or 4 in FIG. 8 (e.g., the JOINT_NEWMV mode). In an example, when the scaling factor for either the first component or the second component of the one of the at least one MVD associated with the at least one reference frame of the block is not equal to the given value (e.g., 1) for the joint MVD coding mode, only an equal weighting factor (e.g., the equal weighting factor being 4 in Eq. (5) or being 8 in Eq. (6)) is allowed. The equal weighting factor can be pre-defined. In an example, no signaling of the equal weighting factor is needed.

In an embodiment, when the scaling factor for either the first component or the second component of the one of the at least one MVD associated with the at least one reference frame of the block is not equal to the given value (e.g., 1) for the joint MVD coding mode, a pre-defined look-up table can be used to determine the associated weighting factor for weighted averaging of multiple prediction samples. FIG. 9 shows an exemplary pre-defined look-up table according to an embodiment of the disclosure. The first column of the look-up table shows a scaling factor pair (two scaling factors) of the first component and the second component of an MVD. The second column of the look-up table shows a weighting factor corresponding to the respective scaling factor pair in the first column. The weighting factor in the second column can be 3 and/or 5 when a sum of the weights for averaging two prediction samples is 8 (e.g., Eq. (5)). The weighting factor in the second column can be 6 and/or 10 when the sum of the weights for averaging the two prediction samples is 16 (e.g., Eq. (6)).

In an embodiment, when the scaling factor for either the first component or the second component of the one of the at least one MVD associated with the at least one reference frame of the block is not equal to the given value (e.g., 1) for the joint MVD coding mode, only unequal weighting factor(s) can be used in the weighted average of the multiple prediction samples and the equal weighting factor(s) are not allowed. In an example, the subset of the list of weighting factors includes only the unequal weighting factor(s). For example, only one or multiple sets of unequal weighting factors can be used in the weighted average of the multiple prediction samples (e.g., the two prediction samples). Each set of unequal weighting factors can be pre-defined and can be used for each scaling factor pair for the first component and the second component of the at least one MVD. In an embodiment, only 2 unequal weighting factors can be used to perform the weighted average of the two prediction samples. The 2 unequal weighting factors can be 3 and 5, for example, if the sum of the weights for averaging two prediction samples is 8 (e.g., Eq. (5)). The 2 unequal weighting factors can be 6 and 10, for example, if the sum of the weights for averaging two prediction samples is 16 (e.g., Eq. (6)).

The joint MVD coding mode is selected to code the block. According to an embodiment of the disclosure, when an equal weighting factor is applied to each reference block of the block (e.g., the equal weighting factor is used to average the prediction samples from the multiple reference frames), the list of scaling factors L0s can be allowed to scale the components of the at least one MVD associated with the at least one reference frame (e.g., the reference frame 0 and/or the reference frame 1). Otherwise, when unequal weighting factor(s) are used to average the prediction samples from the multiple reference frames, only a subset of the list of scaling factors L0s can be allowed. In an example, scaling factor information (e.g., a scaling factor index) can be signaled to indicate which scaling factors in (i) the subset of the list of scaling factors L0s or (ii) the list of scaling factors L0s can be used in the joint MVD coding mode.

In an embodiment, when the unequal weighting factor(s) are used to average the prediction samples from the multiple reference frames, the scaling factors used to scale the first component and the second component (e.g., the vertical and the horizontal components) of the at least one MVD can be restricted to be the given predefined value (e.g., 1).

In an embodiment, when the unequal weighting factor(s) are used to average the prediction samples from the multiple reference frames, the scaling factors used to scale the first component and the second component (e.g., the vertical and the horizontal components) of the at least one MVD are not allowed to be the given predefined value (e.g., 1).

In an embodiment, when the joint MVD coding mode is selected to code the block, a context (e.g., for CABAC) for signaling a weighting factor index, for example, to blend (e.g., a weighted average) multiple prediction samples can depend on the scaling factor information, such as the scaling factors of the components of the at least one MVD associated with the at least one reference frame. The weighting factor index can indicate a weight in (i) the list of weighting factors L0w or (ii) the subset of the list of weighting factors L0w.

In an embodiment, the context for signaling the weighting factor index is a first context when the scaling factor information indicates that each of the scaling factors of the components of the at least one MVD is the given value (or the pre-defined scaling factor, such as 1). Otherwise, when the scaling factor information indicates that at least one of the scaling factors is different from the given value, the context for signaling the weighting factor index is another set of contexts (e.g., a second context) that is different from the first context.

In an embodiment, the context for signaling the weighting factor index can depend on whether the block is coded with the joint MVD coding mode. In an example, the weighting factor index can indicate the weighting factor used to blend the two prediction samples, e.g., by a weighted average of the two prediction samples.

In an embodiment, a high-level syntax can be signaled at a high-level, such as a sequence level, a frame level, a slice level, a super block level, a CTU level, or the like to indicate whether all the supported weighting factors (e.g., the list of weight factors L0w) or a subset of weighting factors (e.g., the subset of the list of weight factors L0w) are allowed for the joint MVD coding mode when one of the scaling factors for the components of the at least one MVD is not equal to the pre-determine value such as 1.

In an embodiment, a context (e.g., for CABAC) for signaling the scaling factor information (e.g., a scaling factor index) indicating the scaling factors for the components of the at least one MVD in the JMVD mode depends on weighting factor information that indicates the weighting factor index.

Figure 10:
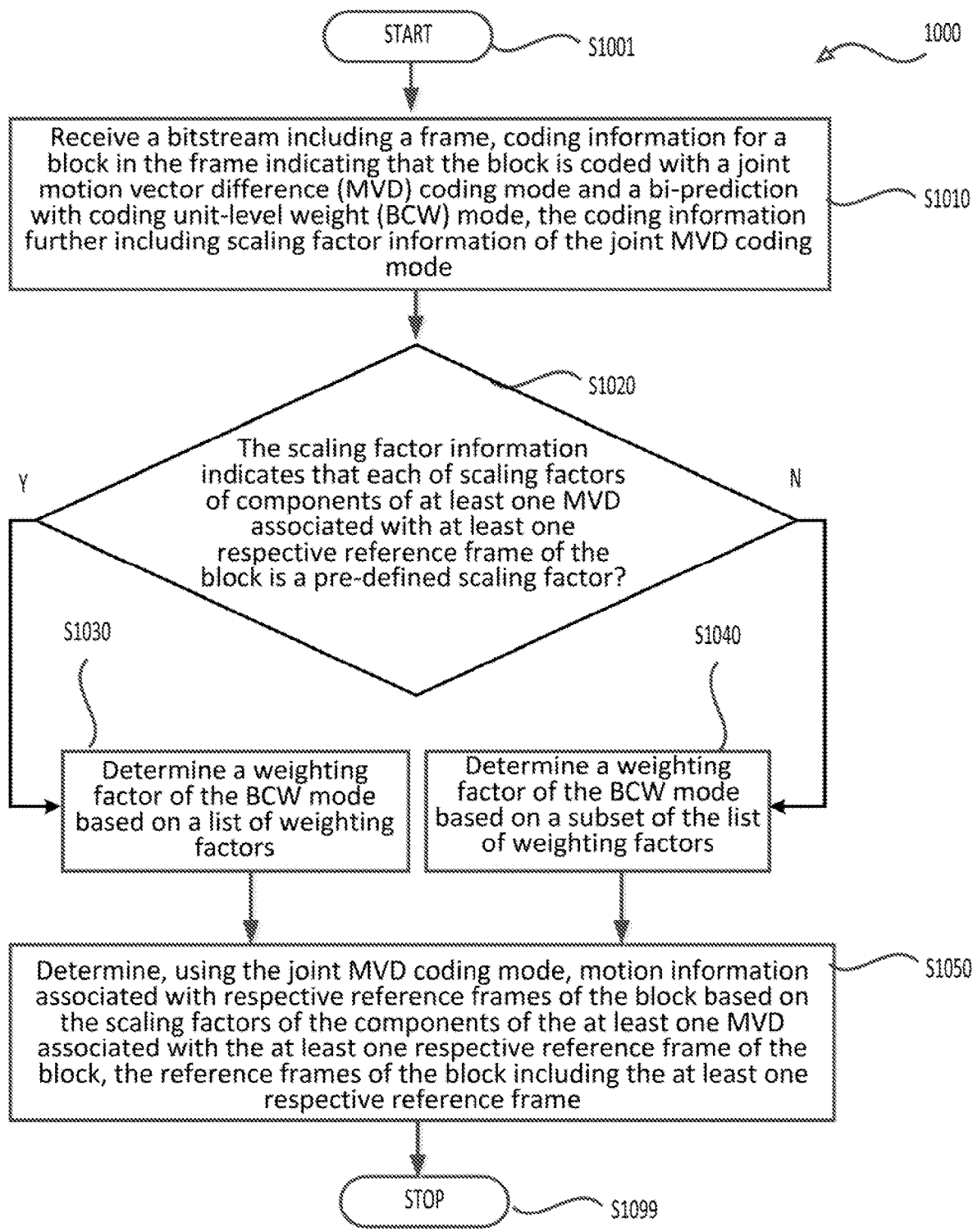
FIG. 10 shows a flow chart outlining a decoding process according to an embodiment of the disclosure.

FIG. 10 shows a flow chart outlining a process (1000) according to an embodiment of the disclosure. The process (1000) can be used in a video/image decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process (1000) starts at (S1001) and proceeds to (S1010).

At (S1010), a bitstream including a frame (also referred to as a picture) can be received. Coding information for a block in the frame can indicate that the block is coded with the joint MVD coding mode and the compound weighted prediction mode (or the BCW mode). The coding information can further include scaling factor information of the joint MVD coding mode.

At (S1020), whether the scaling factor information indicates that each of scaling factors of components of at least one MVD associated with at least one respective reference frame of the block is a pre-defined scaling factor (e.g., 1) can be determined. If the scaling factor information indicates that each of the scaling factors of the components of the at least one MVD associated with the at least one respective reference frame of the block is the pre-defined scaling factor, the process (1000) proceeds to (S1030). Otherwise, if the scaling factor information indicates that at least one of the scaling factors is different from the pre-defined scaling factor, the process (1000) proceeds to (S1040).

At (S1030), a weighting factor of the BCW mode can be determined based on a list of weighting factors, such as L0w. In an example, the list of weighting factors is pre-defined and is not signaled in the bitstream. In an example, the list is signaled in the bitstream. The process (1000) proceeds to (S1050).

At (S1040), the weighting factor of the BCW mode can be determined based on a subset of the list of weighting factors. In an example, the subset of the list is pre-defined and is not signaled in the bitstream. In an example, the subset of the list is signaled in the bitstream. The process (1000) proceeds to (S1050).

At (S1050), motion information associated with respective reference frames of the block can be determined using the joint MVD coding mode and based on the scaling factors of the components of the at least one MVD associated with the at least one respective reference frame of the block. The reference frames of the block can include the at least one respective reference frame. Then, the process proceeds to (S1099) and terminates.

The process (1000) can be suitably adapted. Step(s) in the process (1000) can be modified and/or omitted. Additional step(s) can be added. Any suitable order of implementation can be used.

In an example, the block can be reconstructed using the BCW mode and based on the motion information associated with the respective reference frames of the block and the determined weighting factor.

In an example, the steps (S1020), (S1030), and (S1040) can be adapted as follows. If the scaling factor information indicates that each of the scaling factors of the components of the at least one MVD associated with the at least one respective reference frame of the block is the pre-defined scaling factor, the weighting factor of the BCW mode is determined based on the list of weighting factors. Otherwise, if the scaling factor information indicates that the at least one of the scaling factors is different from the pre-defined scaling factor, the weighting factor of the BCW mode can be determined based on the subset of the list of weighting factors.

In an embodiment, the scaling factor information indicates that the at least one of the scaling factors is different from the pre-defined scaling factor, the subset of the list of weighting factors includes only one weighting factor, and the determined weighting factor is the one weighting factor and is not signaled.

In an example, the one weighting factor is an equal weighting factor. A prediction block of the block is obtained by averaging reference blocks in the respective reference frames with the equal weighting factor for each reference block, such as described with reference to Eq. (4) with the equal weighting factor being 4. The block can be reconstructed based on the prediction block.

In an example, the weighting factor is determined based on the scaling factors of the components of the at least one MVD, such as described with reference to FIG. 9. For example, the weighting factor is determined based on a pre-defined relationship (e.g., the look-up table in FIG. 9) between the weighting factor (e.g., the weighting factor in FIG. 9) and scaling factors (e.g., scaling factor pairs in FIG. 9) of components of one of the at least one MVD. In an example, the reference frames include a first reference frame with a first weighting factor and a second reference frame with a second weighting factor and a sum of the first weighting factor and the second weighting factor is a constant. If the constant is 8, the weighting factor is 3 or 5, and the first weighting factor and the second weighting factor include 3 and 5. If the constant is 16, the weighting factor is 6 or 10, and the first weighting factor and the second weighting factor include 6 and 10. A prediction block of the block can be obtained by averaging the first reference frame with the first weighting factor and the second reference frame with the second weighting factor, and the block can be reconstructed based on the prediction block.

In an embodiment, the subset of the list of weighting factors includes only unequal weighting factors. The weighting factor can be determined as one of the unequal weighting factors. A prediction block of the block can be obtained by averaging reference blocks in the respective reference frames with respective unequal weighting factors that are determined based on the one of the unequal weighting factors, such as described in Eq. (5) where the weight factors are not 4. In an example, the unequal weighting factors are two unequal weighting factors including the weighting factor, the reference blocks include a first reference block and a second reference block, and the prediction block is obtained by averaging the first reference block and the second reference block with the two unequal weighting factors, respectively. In an example, the two unequal weighting factors include (i) 3 and 5 or (ii) 6 and 10.

In an embodiment, a context (e.g., for CABAC) for signaling a weighting factor index depends on the scaling factor information. The weighting factor can be determined based on (i) the weighting factor index and (ii) the list of weighting factors or the subset of the list of weighting factors.

In an example, the context for signaling the weighting factor index is a first context based on the scaling factor information indicating that each of the scaling factors of the components of the at least one MVD is the pre-defined scaling factor, and the context for signaling the weighting factor index is a second context that is different from the first context based on the scaling factor information indicating that the at least one of the scaling factors is different from the pre-defined scaling factor.

Figure 11:
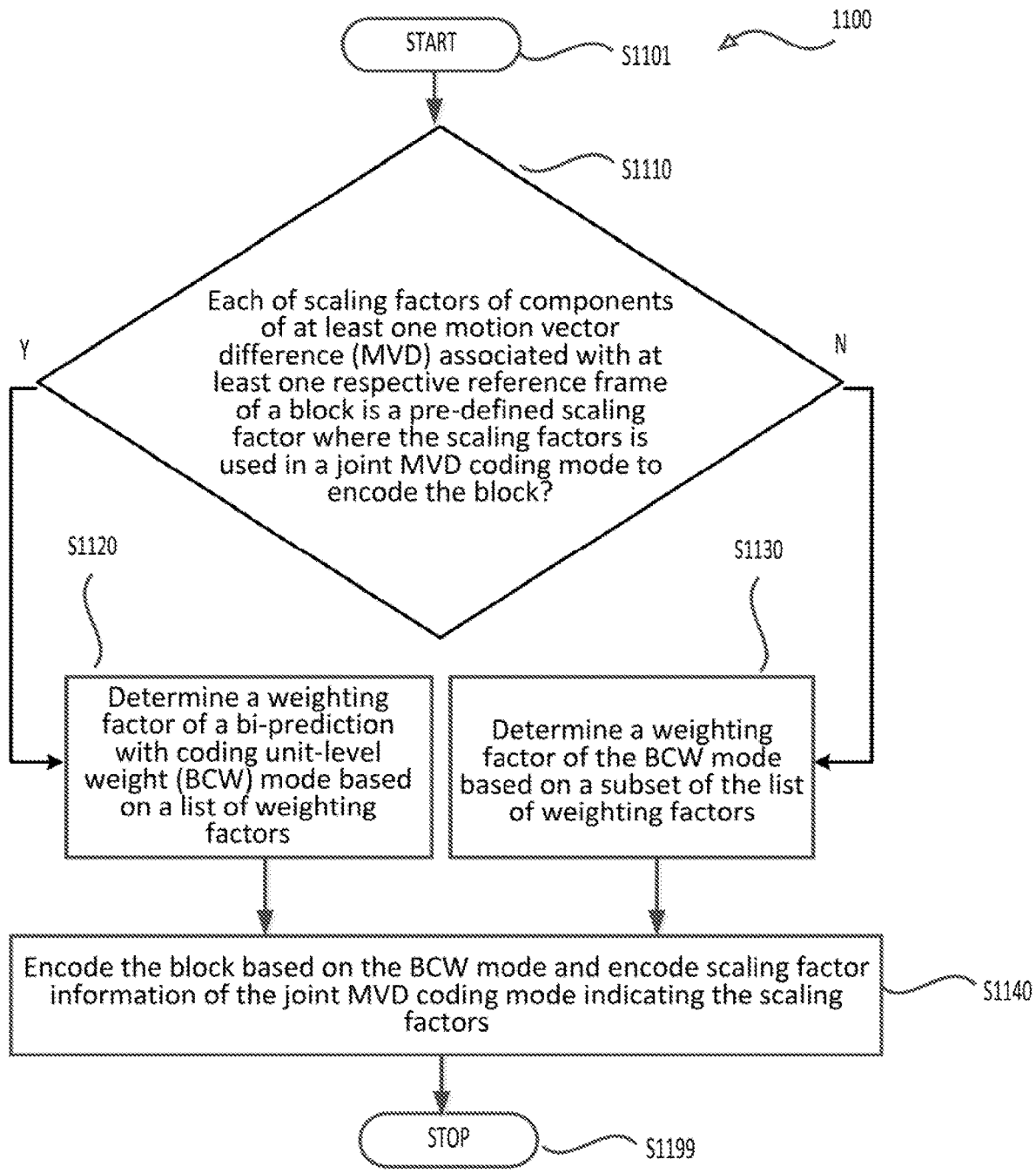
FIG. 11 shows a flow chart outlining an encoding process according to an embodiment of the disclosure.

FIG. 11 shows a flow chart outlining a process (1100) according to an embodiment of the disclosure. The process (1100) can be used in a video encoder. In various embodiments, the process (1100) is executed by processing circuitry, such as the processing circuitry that performs functions of the video encoder (103), the processing circuitry that performs functions of the video encoder (303), and the like. In some embodiments, the process (1100) is implemented in software instructions, thus when the processing circuitry executes the software instructions, the processing circuitry performs the process (1100). The process (1100) starts at (S1101) and proceeds to (S1110).

At (S1110), whether each of scaling factors of components of at least one MVD associated with at least one respective reference frame of a block is a pre-defined scaling factor can be determined. The scaling factors can be used in the joint MVD coding mode to encode the block in a frame. Further, the BCW mode can be applied to encode the block. If each of the scaling factors of the components of the at least one MVD associated with the at least one respective reference frame of the block is determined to be the pre-defined scaling factor (e.g., 1), the process (1100) proceeds to (S1120). Otherwise, at least one of the scaling factors is different from the pre-defined scaling factor, the process (1100) proceeds to (S1130).

At (S1120), a weighting factor of the BCW mode can be determined based on a list of weighting factors, such as L0w. The process (1100) proceeds to (S1140).

At (S1130), the weighting factor of the BCW mode can be determined based on a subset of the list of weighting factors. The process (1100) proceeds to (S1140).

At (S1140), the block can be encoded based on the BCW mode, for example, the block can be predicted using Eq. (5) or Eq. (6).

Scaling factor information of the joint MVD coding mode can be encoded to indicate the scaling factors. The scaling factor information can indicate the scaling factors of the components of the at least one MVD associated with the at least one respective reference frame of a block. In an example, the encoded scaling factor information is included in a video bitstream.

Then, the process (1100) proceeds to (S1199) and terminates.

The process (1100) can be suitably adapted. Step(s) in the process (1100) can be modified and/or omitted. Additional step(s) can be added. Any suitable order of implementation can be used.

In an example, prior to (S1110), the scaling factors of the components of the at least one MVD associated with the at least one respective reference frame can be determined. Motion information associated with respective reference frames of the block can be determined. The reference frames of the block include the at least one respective reference frame. The at least one MVD associated with the at least one respective reference frame of the block can be determined based on the motion information. The scaling factors of the components of the at least one MVD associated with the at least one respective reference frame can be determined, for example, based on the at least one MVD. In an example, the scaling factors are further determined based on POC differences between the respective reference frames and a current frame that includes the block.

Various embodiments described in the process (1000) can be applied to the process (1100) used in an encoding process.

Figure 12:
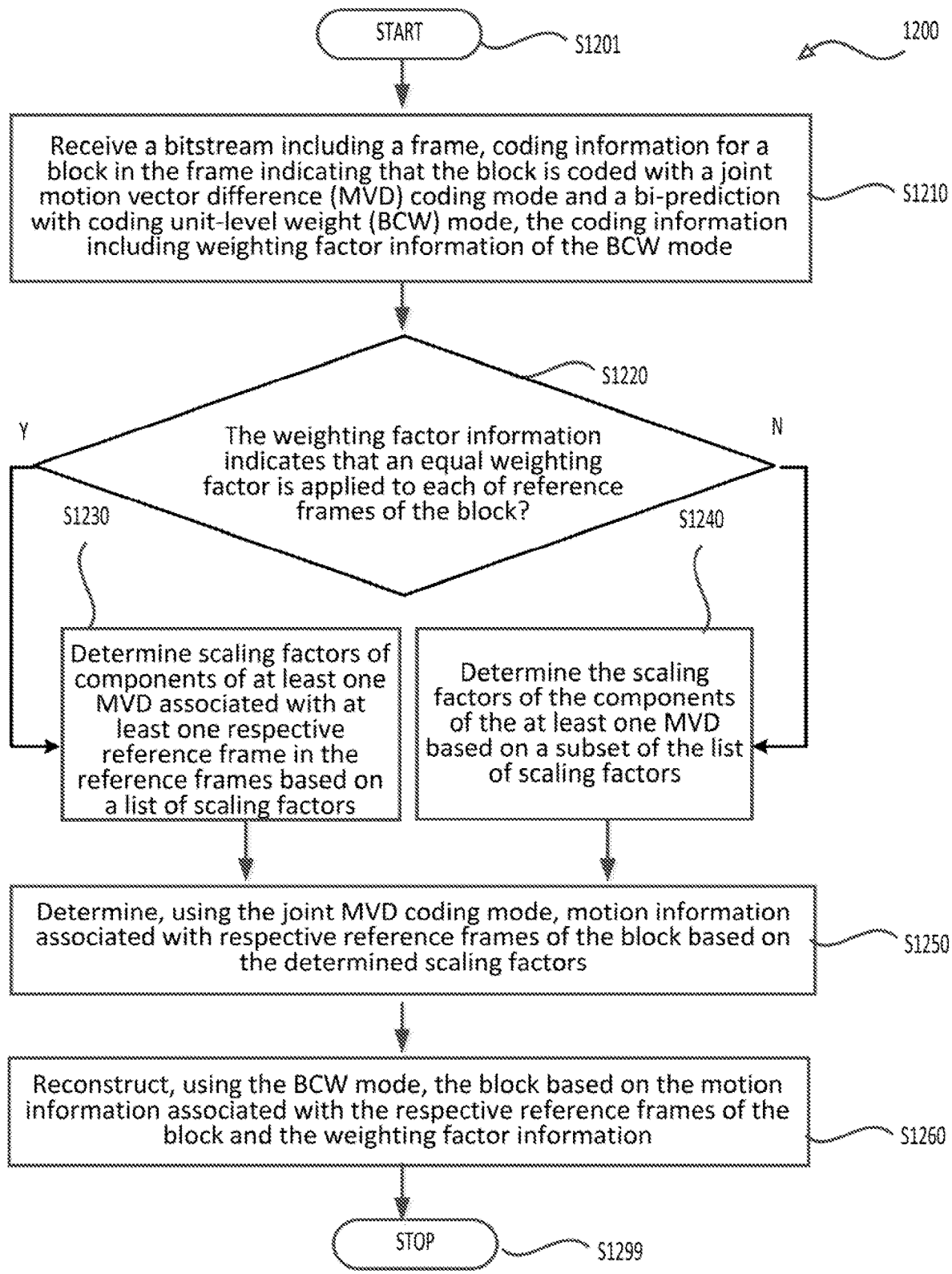
FIG. 12 shows a flow chart outlining a decoding process according to an embodiment of the disclosure.

FIG. 12 shows a flow chart outlining a process (1200) according to an embodiment of the disclosure. The process (1200) can be used in a video/image decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process (1200) starts at (S1201) and proceeds to (S1210).

At (S1210), a bitstream including a frame can be received. Coding information for a block in the frame can indicate that the block is coded with the joint MVD coding mode and the BCW mode. The coding information can further include weighting factor information of the BCW mode.

At (S1220), whether the weighting factor information indicates that an equal weighting factor is applied to each of reference frames of the block can be determined. If the weighting factor information is determined to indicate that the equal weighting factor is applied to each of reference frames of the block, the process (1200) proceeds to (S1230). Otherwise, if the weighting factor information is determined to indicate that unequal weighting factors are applied to the reference frames of the block, the process (1200) proceeds to (S1240).

At (S1230), scaling factors of components of at least one MVD associated with at least one respective reference frame in the reference frames can be determined based on a list of scaling factors, such as L0s. The process (1200) proceeds to (S1250).

At (S1240), the scaling factors of the components of the at least one MVD associated with the at least one respective reference frame in the reference frames can be determined based on a subset of the list of scaling factors. The process (1200) proceeds to (S1250).

At (S1250), motion information associated with the respective reference frames of the block can be determining using the joint MVD coding mode and based on the determined scaling factors.

At (S1260), the block can be reconstructed, using the BCW mode, based on the motion information associated with the respective reference frames of the block and the weighting factor information. Then, the process (1200) proceeds to (S1299) and terminates.

The process (1200) can be suitably adapted. Step(s) in the process (1200) can be modified and/or omitted. Additional step(s) can be added. Any suitable order of implementation can be used.

In an example, the steps (S1220), (S1230), and (S1240) can be adapted as follows. If the weighting factor information indicates that the equal weighting factor is applied to each of the reference frames of the block, the scaling factors of the components of the at least one MVD associated with the at least one respective reference frame in the reference frames can be determined based on the list of scaling factors. If the weighting factor information indicates that the unequal weighting factors are applied to the reference frames of the block, the scaling factors of the components of the at least one MVD can be determined based on the subset of the list of scaling factors.

In an embodiment, the weighting factor information indicates that the unequal weighting factors are applied to the reference frames of the block, the subset of the list of scaling factors includes only a pre-defined scaling factor, and the determined scaling factors are equal to the pre-defined scaling factor and are not signaled. In an example, the pre-defined scaling factor is 1.

In an embodiment, the weighting factor information indicates that the unequal weighting factors are applied to the reference frames of the block, and the subset of the list of scaling factors does not include the pre-defined scaling factor (e.g., 1).

In an embodiment, a context (e.g., for CABAC) for signaling a scaling factor index depends on the weighting factor information. The scaling factors can be determined based on (i) the scaling factor index and (ii) the list of scaling factors or the subset of the list of scaling factors.

Figure 13:
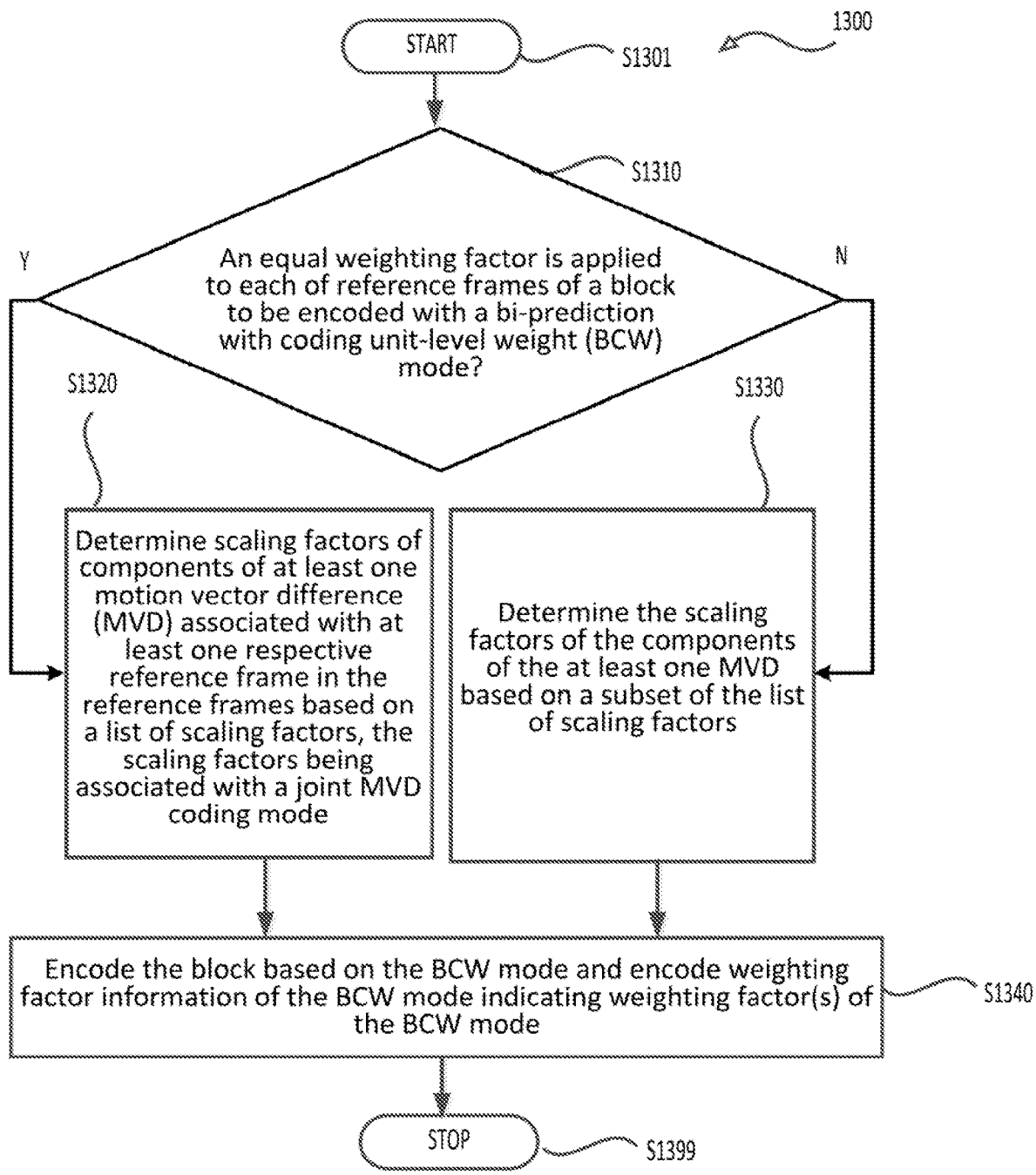
FIG. 13 shows a flow chart outlining an encoding process according to an embodiment of the disclosure.

FIG. 13 shows a flow chart outlining a process (1300) according to an embodiment of the disclosure. The process (1300) can be used in a video encoder. In various embodiments, the process (1300) is executed by processing circuitry, such as the processing circuitry that performs functions of the video encoder (103), the processing circuitry that performs functions of the video encoder (303), and the like. In some embodiments, the process (1300) is implemented in software instructions, thus when the processing circuitry executes the software instructions, the processing circuitry performs the process (1300). The process (1300) starts at (S1301) and proceeds to (S1310).

At (S1310), whether an equal weighting factor is applied to each of reference frames of a block in a frame (or a current frame) can be determined. The block is to be encoded with the BCW mode. If the equal weighting factor is determined to be applied to each of the reference frames of the block to encode the block, the process (1300) proceeds to (S1320). Otherwise, unequal weighting factors are applied to the reference frames of the block to encode the block, the process (1300) proceeds to (S1330).

At (S1320), scaling factors of components of at least one MVD associated with at least one respective reference frame in the reference frames can be determined based on a list of scaling factors (e.g., L0s). The scaling factors are used in the joint MVD coding mode. The process (1300) proceeds to (S1340).

At (S1330), the scaling factors of the components of the at least one MVD associated with the at least one respective reference frame in the reference frames can be determined based on a subset of the list of scaling factors. The process (1300) proceeds to (S1340).

At (S1340), the block can be encoded based on the BCW mode, for example, the block can be predicted using Eq. (5) or Eq. (6).

Weighting factor information of the BCW mode can be encoded to indicate the weighting factor(s) (e.g., the equal weighting factor or the unequal weighting factors). In an example, the encoded weighting factor information is included in a video bitstream.

Then, the process (1300) proceeds to (S1399) and terminates.

The process (1300) can be suitably adapted. Step(s) in the process (1300) can be modified and/or omitted. Additional step(s) can be added. Any suitable order of implementation can be used.

In an example, prior to (S1310), the weighting factor(s) used in the BCW mode to encode the block can be determined based on a pre-defined list of weighting factors, such as $L0_w$ or a subset of $L0_w$.

Various embodiments described in the process (1200) can be applied to the process (1300) used in an encoding process.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. In the disclosure, the term block may be interpreted as a prediction block, a coding block, a coding unit (CU), or the like.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
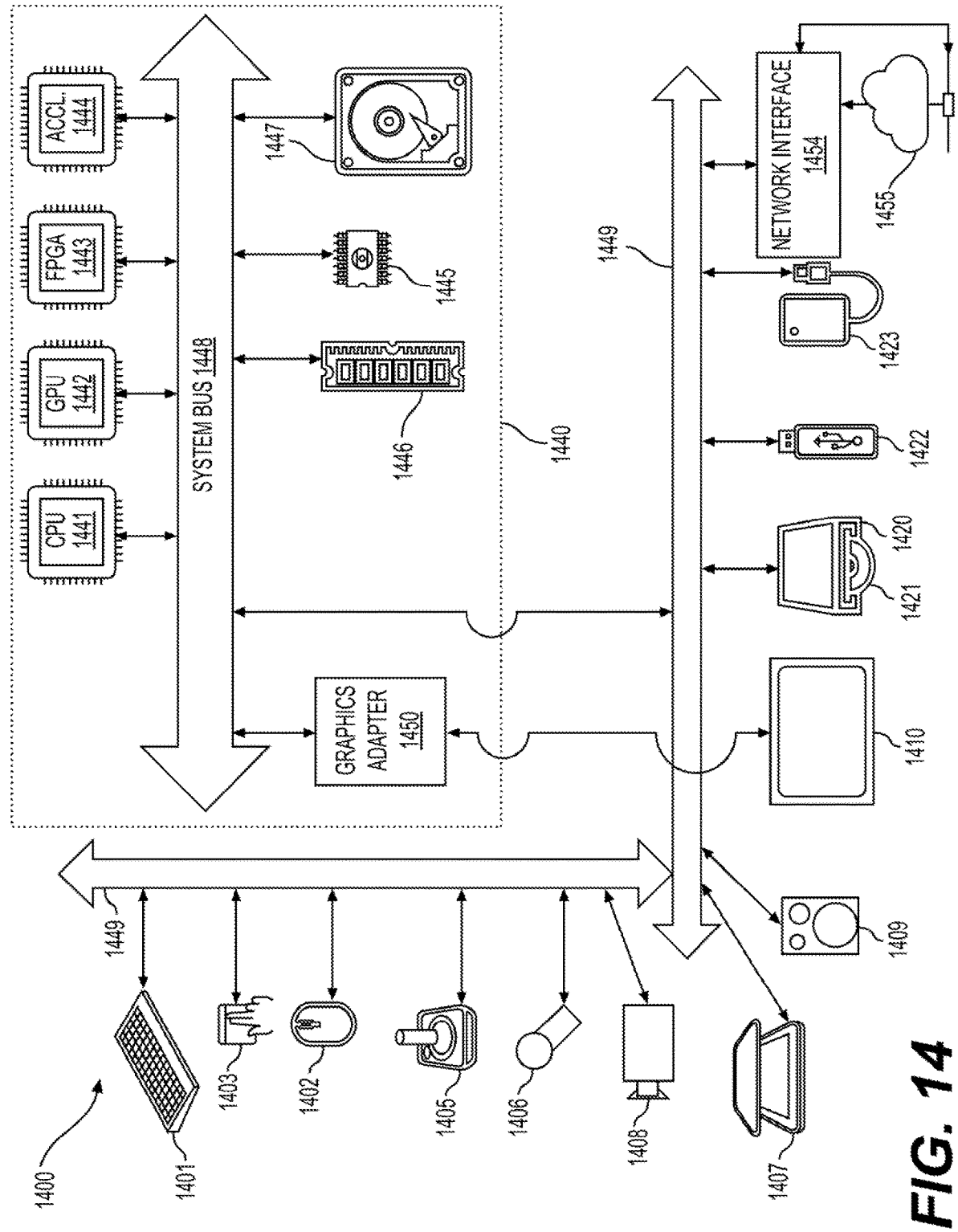
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a video coder, the method comprising:
    receiving a bitstream including a frame, coding information for a block in the frame indicating that the block is coded with a joint motion vector difference (JMVD) coding mode and a compound weighted prediction mode, the coding information further including scaling factor information of the JMVD coding mode;
    in response to the scaling factor information indicating that each of scaling factors of components of at least one MVD associated with at least one respective reference frame of the block is a pre-defined scaling factor, determining a weighting factor of the compound weighted prediction mode based on a list of weighting factors, the list being signaled in the bitstream;
    in response to the scaling factor information indicating that at least one of the scaling factors is different from the pre-defined scaling factor, determining the weighting factor of the compound weighted prediction mode based on a subset of the list of weighting factors, only the subset of the list being signaled in the bitstream;
    determining, using the JMVD coding mode, motion information associated with respective reference frames of the block based on the scaling factors of the components of the at least one MVD associated with the at least one respective reference frame of the block, the reference frames of the block including the at least one respective reference frame; and
    reconstructing, using the compound weighted prediction mode, the block based on the motion information associated with the respective reference frames of the block and the determined weighting factor.

2. The method of claim 1, wherein
    the scaling factor information indicates that the at least one of the scaling factors is different from the pre-defined scaling factor,
    the subset of the list of weighting factors includes only one weighting factor, and
    the determined weighting factor is the one weighting factor and is not signaled.

3. The method of claim 2, wherein
    the one weighting factor is an equal weighting factor, and
    the reconstructing includes
        obtaining a prediction block of the block by averaging reference blocks in the respective reference frames with the equal weighting factor for each reference block; and
        reconstructing the block based on the prediction block.

4. The method of claim 2, wherein
    the determining the weighting factor includes determining the weighting factor based on the scaling factors of the components of the at least one MVD.

5. The method of claim 4, wherein
    the determining the weighting factor includes determining the weighting factor based on a pre-defined relationship between the weighting factor and scaling factors of components of one of the at least one MVD.

6. The method of claim 4, wherein
    the reference frames include a first reference frame with a first weighting factor and a second reference frame with a second weighting factor and a sum of the first weighting factor and the second weighting factor is a constant,
    in response to the constant being 8,
        the weighting factor is 3 or 5, and the first weighting factor and the second weighting factor include 3 and 5, in response to the constant being 16,
the weighting factor is 6 or 10, and
the first weighting factor and the second weighting factor include 6 and 10, and the reconstructing includes
obtaining a prediction block of the block by averaging the first reference frame with the first weighting factor and the second reference frame with the second weighting factor, and
reconstructing the block based on the prediction block.

7. The method of claim 1, wherein
the subset of the list of weighting factors includes only unequal weighting factors;
the determining the weighting factor includes determining the weighting factor as one of the unequal weighting factors; and
the reconstructing includes
obtaining a prediction block of the block by averaging reference blocks in the respective reference frames with respective unequal weighting factors that are determined based on the one of the unequal weighting factors; and
reconstructing the block based on the prediction block.

8. The method of claim 7, wherein
the unequal weighting factors are two unequal weighting factors including the weighting factor,
the reference blocks include a first reference block and a second reference block, and
the obtaining the prediction block includes averaging the first reference block and the second reference block with the two unequal weighting factors, respectively.

9. The method of claim 8, wherein the two unequal weighting factors include (i) 3 and 5 or (ii) 6 and 10.

10. The method of claim 1, wherein
a context for signaling a weighting factor index depends on the scaling factor information;
the determining the weighting factor of the compound weighted prediction mode based on the list of weighting factors includes determining the weighting factor based on the weighting factor index and the list of weighting factors; and
the determining the weighting factor of the compound weighted prediction mode based on the subset of the list of weighting factors includes determining the weighting factor based on the weighting factor index and the subset of the list of weighting factors.

11. The method of claim 10, wherein
the context for signaling the weighting factor index is a first context based on the scaling factor information indicating that each of the scaling factors of the components of the at least one MVD is the pre-defined scaling factor, and
the context for signaling the weighting factor index is a second context that is different from the first context based on the scaling factor information indicating that the at least one of the scaling factors is different from the pre-defined scaling factor.

12. A method of video decoding in a video coder, the method comprising:
receiving a bitstream including a frame, coding information for a block in the frame indicating that the block is coded with a joint motion vector difference (MVD) coding mode and a compound weighted prediction mode, the coding information further indicating weighting factor information of the compound weighted prediction mode;
in response to the weighting factor information indicating that an equal weighting factor is applied to each of reference frames of the block, determining scaling factors of components of at least one MVD associated with at least one respective reference frame in the reference frames based on a list of scaling factors;
in response to the weighting factor information indicating that unequal weighting factors are applied to the reference frames of the block, determining the scaling factors of the components of the at least one MVD based on a subset of the list of scaling factors;
determining, using the joint MVD coding mode, motion information associated with the respective reference frames of the block based on the determined scaling factors; and
reconstructing, using the compound weighted prediction mode, the block based on the motion information associated with the respective reference frames of the block and the weighting factor information.

13. The method of claim 12, wherein
the weighting factor information indicates that the unequal weighting factors are applied to the reference frames of the block,
the subset of the list of scaling factors includes only a pre-defined scaling factor, and
the determined scaling factors are equal to the pre-defined scaling factor and are not signaled.

14. The method of claim 13, wherein the pre-defined scaling factor is 1.

15. The method of claim 12, wherein
the weighting factor information indicates that the unequal weighting factors are applied to the reference frames of the block, and
the subset of the list of scaling factors does not include a pre-defined scaling factor.

16. The method of claim 15, wherein the pre-defined scaling factor is 1.

17. The method of claim 12, wherein
a context for signaling a scaling factor index depends on the weighting factor information;
the determining the scaling factors based on the list of scaling factors includes determining the scaling factors based on the scaling factor index and the list of scaling factors; and
the determining the scaling factors based on the subset of the list of scaling factors includes determining the scaling factors based on the scaling factor index and the subset of the list of scaling factors.

18. An apparatus for video decoding, comprising
processing circuitry configured to:
receive a bitstream including a frame, coding information for a block in the frame indicating that the block is coded with a joint motion vector difference (JMVD) coding mode and a compound weighted prediction mode, the coding information further including scaling factor information of the JMVD coding mode;
in response to the scaling factor information indicating that each of scaling factors of components of at least one MVD associated with at least one respective reference frame of the block is a pre-defined scaling factor, determine a weighting factor of the compound weighted prediction mode based on a list of weighting factors, the list being signaled in the bitstream;

in response to the scaling factor information indicating that at least one of the scaling factors is different from the pre-defined scaling factor, determine the weighting factor of the compound weighted prediction mode based on a subset of the list of weighting factors, only the subset of the list being signaled in the bitstream;

determine, using the JMVD coding mode, motion information associated with respective reference frames of the block based on the scaling factors of the components of the at least one MVD associated with the at least one respective reference frame of the block, the reference frames of the block including the at least one respective reference frame; and reconstruct, using the compound weighted prediction mode, the block based on the motion information associated with the respective reference frames of the block and the determined weighting factor.

19. The apparatus of claim 18, wherein the scaling factor information indicates that the at least one of the scaling factors is different from the pre-defined scaling factor, the subset of the list of weighting factors includes only one weighting factor, and the determined weighting factor is the one weighting factor and is not signaled.

20. The apparatus of claim 19, wherein the one weighting factor is an equal weighting factor, and the processing circuitry is configured to:
    obtain a prediction block of the block by averaging reference blocks in the respective reference frames with the equal weighting factor for each reference block; and
    reconstruct the block based on the prediction block.

* * * * *